March 4, 1958
A. J. HAUCK ET AL
AUTOMATIC CONSTANT CURRENT REGULATOR
EMPLOYING A SATURABLE TRANSFORMER
Filed April 28, 1955
2,825,865
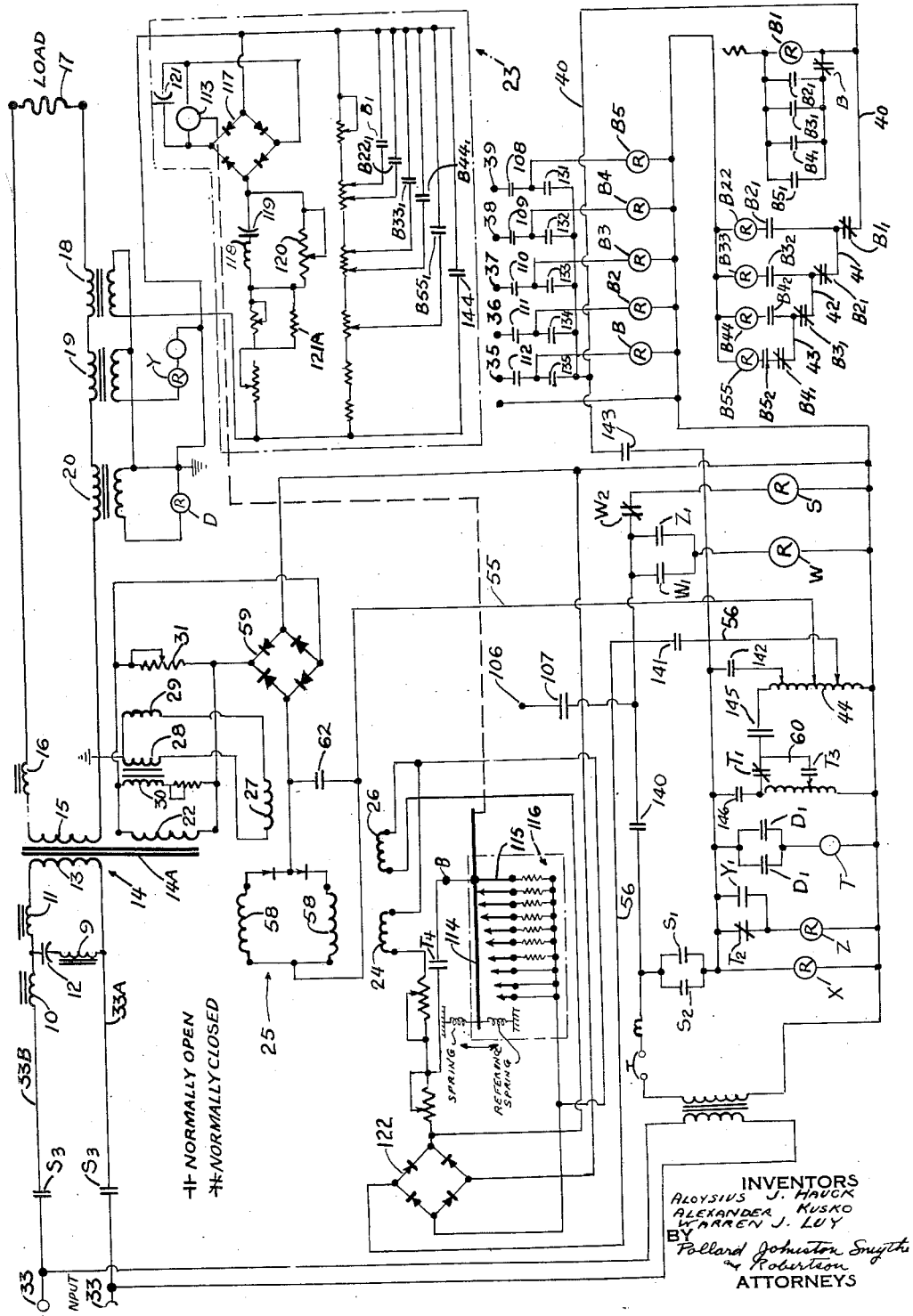
INVENTORS
ALOYSIUS J. HAUCK
ALEXANDER KUSKO
WARREN J. LUY
BY
Pollard Johnston Smythe
& Robertson
ATTORNEYS United States Patent Office 2,825,865
Patented Mar. 4, 1958

2,825,865

AUTOMATIC CONSTANT CURRENT REGULATOR EMPLOYING A SATURABLE TRANSFORMER

Aloysius J. Hauck, Milwaukee, Wis., Alexander Kusko, Newton Centre, Mass., and Warren J. Luy, Milwaukee, Wis., assignors to Hevi Duty Electric Company, Milwaukee, Wis., a corporation of Wisconsin Application April 28, 1955, Serial No. 504,572

12 Claims. (Cl. 323—6)

This invention relates to a system for maintaining constant current at selected levels, particularly in an arrangement including a resonant circuit and a saturable electromagnetic device in the system.

It is desirable in certain electrical loads, such as a lighting circuit for an airfield or the like, to provide an arrangement wherein the current will be kept constant in the load circuit. It also is necessary to be able to select varying levels of brightness in said load circuit and to provide against disturbances affecting operation of the devices. The regulation of the current to a lamp load of this character must be kept within a relatively narrow range so as to obtain reasonable lamp life and steady illumination.

One of the objects of the invention is to provide an arrangement wherein constant current at predetermined selected levels will be supplied to the load regardless of variations, within certain limits, of line voltage, frequency, and other factors.

Another object of the invention is to provide an arrangement wherein changes in the root mean square (R. M. S.) load current will be sensed and employed to adjust the system so as to maintain a constant value of R. M. S. current to the load.

A still further object of the invention is to provide a circuit arrangement to produce a constant R. M. S. current in the load circuit within a predetermined band of different frequencies.

A still further object of the invention is to provide a circuit arrangement wherein the brightness of a lighting load connected thereto can be controlled, the current being maintained constant for any selected value of brightness.

In one aspect of the invention, a source of alternating current may be connected to a resonant constant voltage to constant current transformation circuit, the output of the circuit being connected to a saturable electro-magnetic device having at least a control and load winding. The saturable electro-magnetic device preferably is a saturable output transformer having a primary and secondary winding means and a saturating control winding. A sensing means producing a control signal is associated with the load circuit, a signal being produced to give a control effect upon the saturable output transformer in respect to changes in root mean square current, referred to herein as R. M. S. current, in the load circuit. The sensing means can operate through an amplifying arrangement. In order to vary the levels of the value of the current in the load circuit, an arrangement can be provided to change the relation of the signal to the load current in the sensing circuit, such being a change to produce the desired current level or brightness in the load.

The sensing circuit includes a comparing means and an amplifying arrangement so as to produce a compared and amplified signal for the control winding of the saturable output transformer. In one form, another amplifier can be employed, such as a magnetic amplifier for furnishing the required current to the control winding of the saturable transformer, but other types of amplifiers could be used, such as electronic, hydraulic, servo-mechanisms, etc.

In changing the level of the load current to be maintained, a selective switching circuit may be used so that even though more than one control should be actuated in the selection of a current level to be maintained, the control automatically will operate only on the lowest of the selected levels or vice-versa. In other words, if the brightness of a lighting circuit is being controlled, the lowest level called for automatically will be selected.

If the regulator is to be used on commercial frequencies of different values, e. g. 50 or 60 cycles, it must be stable and furnish constant current to the load at the selected value and the circuit is arranged to provide for such operation.

In a still further aspect, the circuit is arranged to use the saturable electro-magnetic device to limit voltage in case of open circuit conditions, the same circuit also serving to deenergize the circuit after a predetermined time if open circuit conditions continue.

Other objects, advantages and features of the invention will become apparent from the following description and drawings which are merely exemplary.

In the drawings the single figure illustrates one form of circuit for carrying out various aspects of the invention.

The system will be described specifically in conjunction with use for a lighting circuit load, such as one employed for airport lighting purposes in which the load may include devices having non-linear characteristics, wherein varying brightness of the lamp is required and the load current must be kept constant regardless of voltage input variations or variations in other factors. It is to be understood that it can be used for other purposes.

The input terminals 33, 33 may be connected to a suitable source of alternating current energy, conventional normally open switch contacts $S_3$, $S_3$ being provided in the supply leads 33A and 33B, said switches being closed in a manner which will be described hereafter when it is desired to energize the circuit.

In the form illustrated, the resonant circuit preferably includes an input inductive reactance or reactor 10, output inductive reactance or reactor 11, and capacitor 12 connected in a cross branch between said reactors and across a saturable electro-magnetic means. The saturable electro-magnetic means preferably is a saturable output transformer 14 having primary 13, secondary 15, and control winding 22, said transformer having a core 14A. The purpose of inductive reactor 9 in series with capacitor 12 in its cross branch will be explained later. The load circuit connected to secondary 15 of saturable output transformer may include load reactor 16 which may be internally mounted. Load 17 may comprise reactive and resistive elements, such as lamps, open isolating transformers, or other devices having non-linear characteristics.

It has been found that the reactance of output reactor 11 and the reflected reactance of the load and load reactor 16 should be approximately one-half of the reactance of input reactor 10 in order to keep constant the output current within a band of input frequencies, for example, 47 to 63 cycles per second.

Particularly with non-linear loads, there may be disturbances caused by harmonics reflected back into the resonant circuit causing undesirable results. One way of attenuating these disturbances is to include inductive reactance 9 in series with capacitor 12 in the branch across the primary 13 of saturable output transformer 14.

Connected in the load circuit is a sensing current transformer 18, a metering current transformer 19, and a non-linear current transformer 20, said non-linear current transformer being connected to an open circuit protective relay 21. The functions of these various components now will be described.

The sensing circuit arrangement is for the purpose of measuring the load current and serves to provide corrective action for saturating winding 22 of saturable output transformer 14.

In the form shown, a magnetic amplifier 25 is used in conjunction with the sensing and amplifying circuit arrangement for further amplifying the control signal.

In order to properly control the system, the sensing circuit should be responsive to root mean square (R. M. S.) values of current, one form being illustrated in box 23, it being understood that said sensing arrangement could take other forms.

As will be explained hereafter, the R. M. S. sensing and comparing arrangement feeds a signal to the signal winding 24 of magnetic amplifier 25, said amplifier having a bias supply winding 26 adjusted so that at zero current in the signal winding 24, minimum current is fed to saturating winding 22 of output transformer 14.

Feedback coil 27 is connected to the circuit through damping transformer 28 whose primary 30 receives a current proportional to the voltage impressed across saturating or control winding 22 of saturable output transformer 14. One of the purposes of damping transformer 28 is to eliminate hunting. Resistor 31 may be connected across saturating winding 22 of output transformer 14 for the purpose of minimizing effects of rectification of harmonics from the saturating winding 22 of output transformer 14.

In a system of the type described herein, it is frequently necessary to be able to operate the same from a remote control station. For automatic operation in such a remote control organization, the desired output level or current may be selected by closing appropriate switches in the circuit and then energizing one of the lines 35, 36, 37, 38, 39 from a remote location switching control point. For example, if maximum brightness or output current is selected, line 39 is activated and relay solenoid B5 will be energized, line 106 having been previously energized through a suitable circuit (not shown), and switches 107, 108, 109, 110, 111, and 112 having been closed through a suitable control switch for remote control purposes, 140 being open except when switches 131 to 135 are to be used for local control, 131 through 135 then being selectively closed from a local control switch.

Contacts operated by a solenoid will be given the relay number or letter with appropriate subscripts, the relay solenoid being indicated with an "R," the condition of the switch contacts when unenergized being shown in the legend on the drawing in accordance with the American Standards Association symbols. When automatic control is used, switches 141, 142 and 143 are closed by a suitable switch operating means (not shown).

Energization of solenoid B5 will cause relay solenoid B1 to be deenergized due to closing of contact $B5_1$, which will short the coil of relay B1. When solenoid B1 becomes deenergized, it will permit contacts of switch $B1_1$ to close, said switch being normally closed when B1 is deenergized. Thus, a circuit will be completed through line 40, closed contacts $B1_1$, line 41, contacts $B2_1$, line 42, contacts $B3_1$, line 43, contacts $B4_1$, closed switch $B5_2$, so as to energize relay B55. Switch $B5_2$ was closed by energization of relay B5.

Energization of relay solenoid B55 provides the correct signal to produce the maximum output current, energization of B55 causing closing of normally open contacts $B55_1$.

The R. M. S. current sensing circuit includes in the form shown a controller of the direct acting finger type, such as sold under the name "Regohm." The signal coil or operating solenoid thereof is indicated at 113 in the R. M. S. detector circuit 23. Coil 113 operates an armature 114 shown schematically connected thereto which controls progressive closing or opening of fingers 115 with their respective resistors 116 in the control circuit of the magnetic amplifier. The armature may be pivoted and associated with coil 113 so that when the coil is energized, the armature will be attracted against the force of a reference spring attached to the armature.

The controller solenoid 113 in the R. M. S. sensing circuit is operated through direct current rectifier bridge 117. Current from the sensing transformer 18 passes through the impedance network including reactor 118, capacitor 119 and resistance 120. In order to have the sensing circuit operate accurately under conditions of variation of line frequency, ambient temperature and distortion of load current wave form, capacitor 121 shunted across controller solenoid 113, reactor 118, capacitor 119 and resistor 120 as well as temperature compensating resistor 121A are incorporated in the sensing circuit. This insures the sensing of the R. M. S. value of the load current under the aforementioned conditions. The particular switch closed in the sensing circuit, such as $B55_1$, will have the effect of shunting the current passing through the sensing solenoid 113. Direct current to resistors 116 may be furnished by rectifier bridge 122.

When line 106 is energized from a remote location, the solenoid of relay S will be energized through normally closed switch $W_2$, such serving to energize and close the switch contacts $S_3$, $S_3$ for supplying power from the main input terminals 33, 33. Power supply for the magnetic amplifier 25 is fed from auto-transformer 44 to reactor elements 58, 58 of the magnetic amplifier through line 55. The signal windings 24 receive energization through line 56 and rectifier bridge 122.

In the event the operator should inadvertently select more than one current or brightness level, the circuit will automatically provide for the minimum level to take precedence. As an example, the event both control circuits 38 and 39 were energized, the solenoids of both relays B4 and B5 would be energized. Such would cause relay coil B1 to be shorted out because of closing of contacts $B5_1$ and $B4_1$. As the relay coil of B1 returns to its normally deenergized condition, contact $B1_1$ will return to a normally closed position. This will set up a circuit through lead 40, normally closed contacts $B1_1$, lead 41, normally closed contacts $B2_1$, lead 42, normally closed contacts $B3_1$, closed contacts $B4_2$, thereby energizing the coil of relay B44.

The coil or relay B55 will be prevented from operating because of the normally closed contact $B4_1$ having been opened upon energization of relay B4. Thus, the circuit controlled by B44 or switch contact $B44_1$ will take precedence and the minimum output current of the two positions selected will take precedence. In a similar manner, the remainder of the brightness or current level circuits will operate so that the minimum current level called for by a closed control circuit will become operative in the event more than one is energized.

Direct control can be accomplished as compared with remote control by replacing lines 35 to 39 with a local control switch so that any one of the relays B to B5, inclusive, can be energized directly as desired, such as by energizing or closing the appropriate switches 131 to 135.

In order to control the arrangement manually, instead of through the R. M. S. sensing circuit 23 and relays B to B5 inclusive, reactors 58 of the magnetic amplifier 25 can be bypassed. This can be accomplished by closing a manual to automatic control switch, which will close contacts 62, contact 144, 145 and 146, switches 141, 142 and 143 being opened. Such will connect rectifier bridge 59 directly to an adjustable supply circuit 60, such circuit having a variable current control arrangement therein, voltage being fed from auto-transformer 44.

A protective open circuit means is provided so that in the event current should fail to flow in the load circuit, current will fail to flow in the secondary of the open circuit protection transformer 20 which will deenergize relay D. This will permit opening of normally open switch contacts $D_1$, $D_1$, dropping out relay T which will return normally closed contacts $T_2$ to closed position, thereby energizing the time delay relay Z. In the event time delay relay Z is energized for more than one second or other suitable setting, normally open contacts $Z_1$ will close, thus energizing solenoid W to close contact $W_1$. Normally closed contact $W_2$ will now open to deenergize solenoid S, thereby permitting contacts $S_1$, $S_2$ to open and thus deenergize solenoid X. This will open main supply switch contacts $S_3$, $S_3$.

When relay T first becomes deenergized, normally closed contacts $T_1$ will close and contacts $T_3$ will open so as to shift the voltage from auto-transformer 44 to a maximum value, thereby providing maximum saturating current for the output saturable transformer. Thus, the open circuit voltage will be limited to a safe value.

The open circuit protective transformer 20 may be so arranged, for example, that when two amperes flow in the primary thereof, the secondary may have eight amperes flowing to relay D and as the amperage in the primary rises to 20 amperes the current through solenoid D will be about eleven amperes. This will prevent damage to relay D and yet provide the necessary sensitive response.

In the event of failure in the magnetic amplifier or its associated parts and current in the load circuit should become excessive, protective transformer 19 will have an increase in current through its secondary and relay Y so as to close contacts $Y_1$, which will energize the time delay relay Z in the same manner as described for the open secondary circuit protection. The solenoid of relay Y preferably has a high ratio of drop-out to pick-up current. In other words, relay Y will change positions with a very small differential current, particularly so that it may drop out after occurrence of a transient in which the current has exceeded the normal value.

Variations may be made in the circuit and arrangement of parts without departing from the spirit of the invention except as defined in the appended claims.

What is claimed is:

1. In a system for supplying constant alternating current at predetermined levels to a power distribution circuit, the combination including a resonant constant voltage to constant current transformation circuit connected to said load circuit through a saturable electro-magnetic transformer having a control winding, root mean square load current sensing comparing means for producing a signal upon deviation of said load current from a predetermined value, a magnetic amplifier connected to said control winding, means connecting said sensing means to said magnetic amplifier, and means selectively varying said sensing means signal in accordance with the desired predetermined load level.

2. In a system for supplying constant alternating current at varying levels to a load circuit, the combination including a resonant constant voltage to constant current transformation circuit connected to said load circuit through a saturable electro-magnetic device, said device having a control winding, load current sensing and amplifying means for producing a signal upon deviation of said load current from a predetermined value, said sensing and amplifying means being connected to said electro-magnetic device for selectively varying said sensing means signal in accordance with a selected load current level so as to maintain said selected level constant, a plurality of switching circuits connected to said sensing means for varying the sensing means signal in accordance with the circuit energized, and circuit means connected with said switching circuits for selecting automatically a predetermined one of said switching circuits if more than one becomes energized.

3. In a system for supplying constant alternating current at predetermined levels to a load circuit, the combination including a resonant constant voltage to constant current transformation circuit connected to said load circuit through a saturable electro-magnetic device having a control winding, load current sensing and amplifying means for producing a signal upon deviation of said load current from a predetermined value, said sensing and amplifying means being connected to said electro-magnetic device operable to vary said sensing means signal in accordance with a predetermined selected load current level so as to maintain said selected level constant, a plurality of switching circuits connected to said sensing means for varying the sensing means signal in accordance with the circuit energized, and circuit means connected with said switching circuits for selecting the minimum load current level if more than one becomes energized.

4. In a system for supplying alternating current at predetermined levels to a load circuit, the combination comprising a saturable output transformer having a control winding, a resonant circuit having an input reactor and output reactor connected in supply leads to the primary of said output transformer, a capacitor connected across said primary and between said reactors, load current sensing and amplifying means for producing a signal upon deviation of said load current from a selected value, and connecting means including magnetic amplifier means between said sensing and amplifying means and said control winding operable to adjust said sensing and amplifying means in accordance with a selected load current value to be maintained.

5. In a system for supplying alternating current at predetermined levels to a load circuit, the combination comprising a saturable output transformer having, a control winding on its core means, a resonant circuit having an input reactor and output reactor connected in the supply leads to the primary of said output transformer, a capacitor connected across said primary and between said reactors, said output reactor being between said capacitor and output transformer, R. M. S. load current sensing and amplifying means for producing a signal upon deviation of said load current from a selected value, a second amplifying means connected to said control winding and said sensing and amplifying means, and switching circut means selectively shunting said sensing and amplifying means for adjusting the signal from said sensing means in accordance with a selected load current value to be maintained.

6. In a system for supplying alternating current at predetermined levels to a load circuit, the combination comprising a saturable output transformer having a control winding on its core means, a resonant circuit having an input reactor and output reactor connected in the supply leads to the primary of said output transformer, a capacitor connected across said primary and between said reactors, said output reactor being between said capacitor and output transformer, R. M. S. load sensing and amplifying means for producing a signal upon deviation of said load current from a selected value, a magnetic amplifier means connected to said control winding and said sensing and amplifying means, and switching circuit means selectively shunting said sensing and amplifying means for adjusting said sensing means in accordance with a selected load current value to be maintained.

7. In a system for supplying alternating current at predetermined levels to a load circuit, the combination comprising a saturable output transformer having a control winding on its core means, a resonant circuit having an input reactor and output reactor connected in the supply leads to the primary of said output transformer, a capacitor connected across said primary and between said reactors, said output reactor being between said capacitor and output transformer, R. M. S. load current sensing and amplifying means for producing a signal upon deviation of said load current from a selected value, a second amplifying means connected to said control winding and said sensing and amplifying means, a reactor in series with said capacitor for counteracting effects of harmonics generated in the control circuit, and switching circuit means selectively shunting said sensing and amplifying means for adjusting the signal from said sensing means in accordance with a selected load current value to be maintained.

8. In a system for supplying alternating current at predetermined levels to a load circuit, the combination comprising a saturable output transformer having a control winding, a resonant circuit having an input reactor and output reactor connected in the supply leads to the primary of said output transformer, a capacitor connected across said primary and between said reactors, R. M. S. load current sensing and amplifying means for producing a signal upon deviation of said load current from a selected value, said sensing means including a rectifier, a solenoid operable by changes in load current and a capacitor in shunt with said solenoid, and connecting means between said sensing and amplifying means operable to selectively adjust said sensing and amplifying means in accordance with a selected load current value to be maintained.

9. In a system for supplying alternating current at predetermined levels to a load circuit, the combination comprising a saturable output transformer having a control winding, a resonant circuit having an input reactor and output reactor connected in the supply leads to the primary of said output transformer, a capacitor connected across said primary and between said reactors, R. M. S. load current sensing and amplifying means for producing a signal upon deviation of said load current from a selected value, circuit elements compensating for changes in frequency in the supply over a predetermined band width, and circuit means for shunting varying values of resistance across said sensing means to adjust the signal from said sensing means for producing different predetermined levels of load current.

10. In a system for supplying alternating current at predetermined levels to a load circuit, the combination comprising a saturable output transformer having primary, secondary and control windings, a resonant circuit having an input reactor and output reactor connected in leads from the supply to the primary of said output transformer, a capacitor connected in a branch across said primary and between said reactors, load current sensing means for producing a signal upon deviation of said load current from a selected value, a plurality of circuits having varying resistances connected across said sensing means for selectively adjusting the signal from said sensing means in accordance with a selected load current value to be maintained.

11. In a system for supplying alternating current at predetermined levels to a power distribution circuit, the combination including a resonant constant voltage to constant current transformation circuit connected to said load circuit through a saturable electro-magnetic device having a control winding, load current sensing means for producing a signal upon deviation of said load current from a predetermined value, said sensing means being connected to said electro-magnetic device operable to change said sensing means signal in accordance with a selected load current level so as to maintain said selected level constant, and a protective circuit means connected to said load circuit and said saturable electro-magnetic device operable to put maximum saturating current on said control winding upon open circuit conditions occuring in said load circuit.

12. In a system for supplying alternating current at predetermined levels to a power distribution circuit, the combination including a resonant constant voltage to constant current transformation circuit connected to said load circuit through a saturable electro-magnetic device having a control winding, load current sensing means for producing a signal upon deviation of said load current from a predetermined value, said sensing means being connected to said electro-magnetic device operable to change said sensing means signal in accordance with a selected load current level so as to maintain said selected level constant, a protective circuit means connected to said load circuit and said saturable electro-magnetic device operable to put maximum saturating current on said control winding upon open circuit conditions occuring in said load circuit, and a timing means connected to said protective circuit and the supply to said transformation circuit operable after a predetermined time of open circuit conditions to open the power supply thereto.

References Cited in the file of this patent

UNITED STATES PATENTS

| | | |
|---|---|---|
| 2,351,681 | Haug | June 20, 1944 |
| 2,714,188 | Scherer | July 26, 1955 |